United States Patent
Motomura et al.

(10) Patent No.: US 7,379,618 B2
(45) Date of Patent: May 27, 2008

(54) IMAGE CONVERSION METHOD, TEXTURE MAPPING METHOD, IMAGE CONVERSION DEVICE, SERVER-CLIENT SYSTEM, AND IMAGE CONVERSION PROGRAM

(75) Inventors: Hideto Motomura, Nara (JP); Katsuhiro Kanamori, Nara (JP); Kenji Kondo, Kyoto (JP); Satoshi Sato, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 91 days.

(21) Appl. No.: 11/454,174

(22) Filed: Jun. 15, 2006

(65) Prior Publication Data

US 2006/0239584 A1 Oct. 26, 2006

Related U.S. Application Data

(63) Continuation of application No. PCT/JP2005/023378, filed on Dec. 20, 2005.

(30) Foreign Application Priority Data

Jan. 19, 2005 (JP) ............................. 2005-011817

(51) Int. Cl.
*G06K 9/36* (2006.01)
*G06T 3/40* (2006.01)

(52) U.S. Cl. .................... 382/274; 382/300; 345/606

(58) Field of Classification Search ................ 382/173, 382/274, 286, 293, 298, 299, 300; 345/426, 345/427, 582, 586, 606
See application file for complete search history.

(56) References Cited

U.S. PATENT DOCUMENTS

| 5,083,287 A | 1/1992 | Obata et al. ................. 395/126 |
| 2005/0212794 A1* | 9/2005 | Furukawa et al. .......... 345/419 |
| 2006/0018539 A1* | 1/2006 | Sato et al. .................. 382/173 |

FOREIGN PATENT DOCUMENTS

| GB | 2 223 384 A | * | 4/1990 |
| JP | 62-204386 A | | 9/1987 |
| JP | 02-275594 A | | 11/1990 |
| JP | 05-181980 A | | 7/1993 |
| JP | 06-258048 A | | 9/1994 |
| JP | 11-066344 A | | 3/1999 |
| JP | 2004-070670 A | | 3/2004 |

OTHER PUBLICATIONS

Shinji Araya, "Clear Commentary on 3D Computer Graphics", Kyoritsu Shuppan Co., Ltd., pp. 144-145, Sep. 25, 2003 and a partial English translation thereof.

(Continued)

*Primary Examiner*—Andrew W. Johns
(74) *Attorney, Agent, or Firm*—Harness Dickey & Pierce, P.L.C.

(57) ABSTRACT

A shadow portion is distinguished in a given image (S2 to S6). On the shadow portion, a conversion process based on the brightness value of a pixel is performed (S7), while on a portion other than the shadow portion, a conversion process based on the surface normal parameter which represents the surface normal of a photograph subject is performed (S8 and S9).

12 Claims, 12 Drawing Sheets

OTHER PUBLICATIONS

H. Greenspan, et al., "Image Enhancement by non-linear extrapolation in frequency space", SPIE vol. 2182 Image and Video Processing II, 1994.

Makoto Nakashizuka, et al., "Image Resolution Enhancement on Multiscale Gradient Planes", The IEICE Transactions (Japanese Edition), D-II vol. J81-D-II No. 10 pp. 2249-2258, Oct. 1998 and a partial English translation thereof.

*Image Processing Handbook* edited by Image Processing Handbook Editorial Committee, Shokodo Co., Ltd., pp. 392-407, Jun. 8, 1987.

R. J. Woodham, "Photometric Method for Determining Surface Orientation from Multiple Images", Optical Engineering vol. 19, No. 1, pp. 139-144, 1980.

Shinji Umeyama, "Separation of Diffuse and Specular Components of Surface Reflection—Using Multiple Observations Through a Polarizer and Probabilistic Independence Property", Symposium on Image Recognition and Understanding 2002, pp. I-469-I-476, 2002 and a partial English translation thereof.

\* cited by examiner

FIG.1A
Case A
FIG.1B
Case B
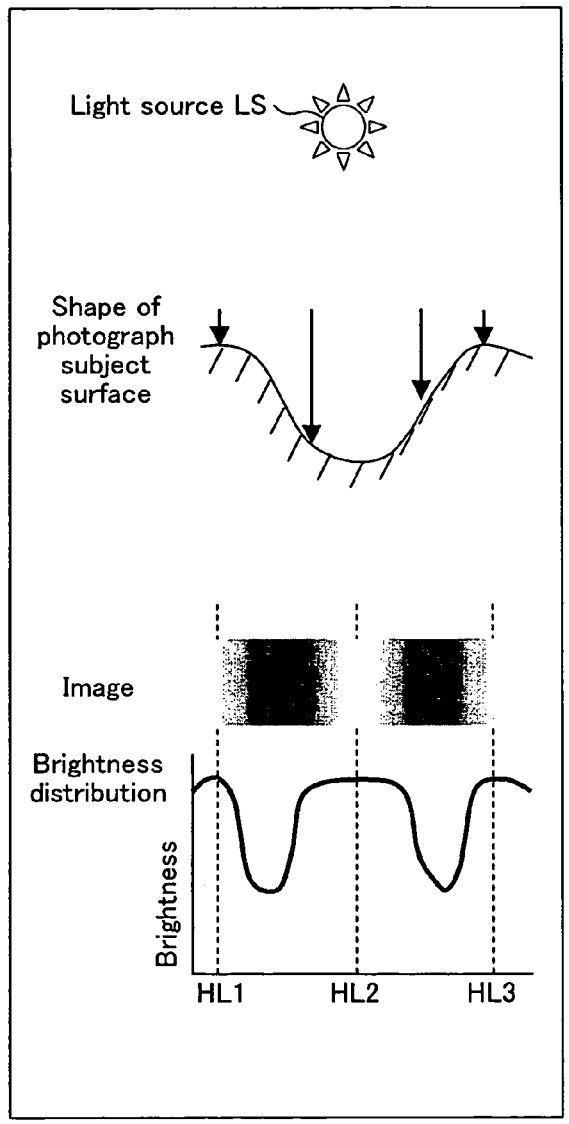
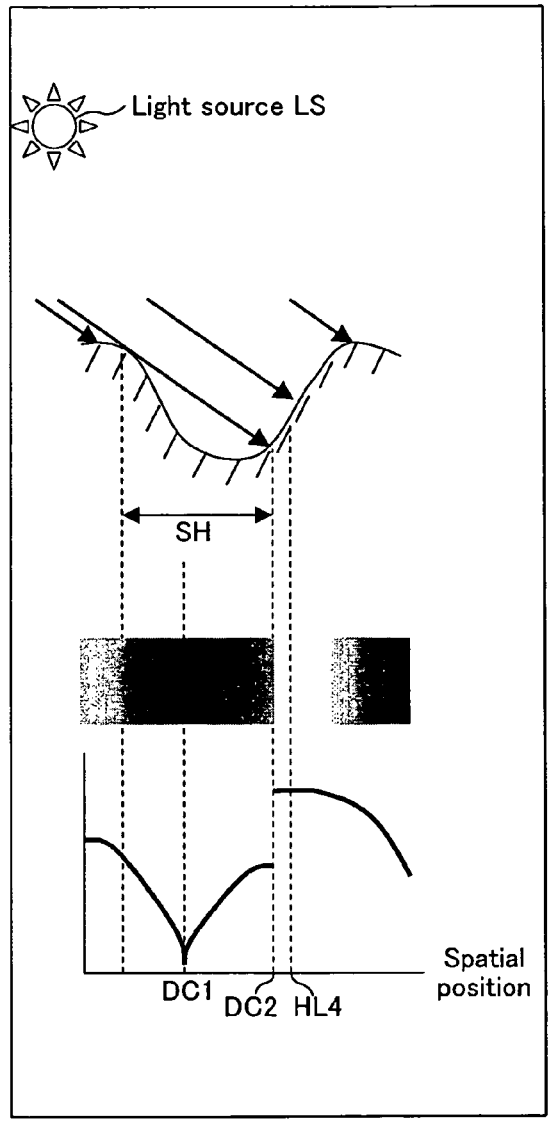

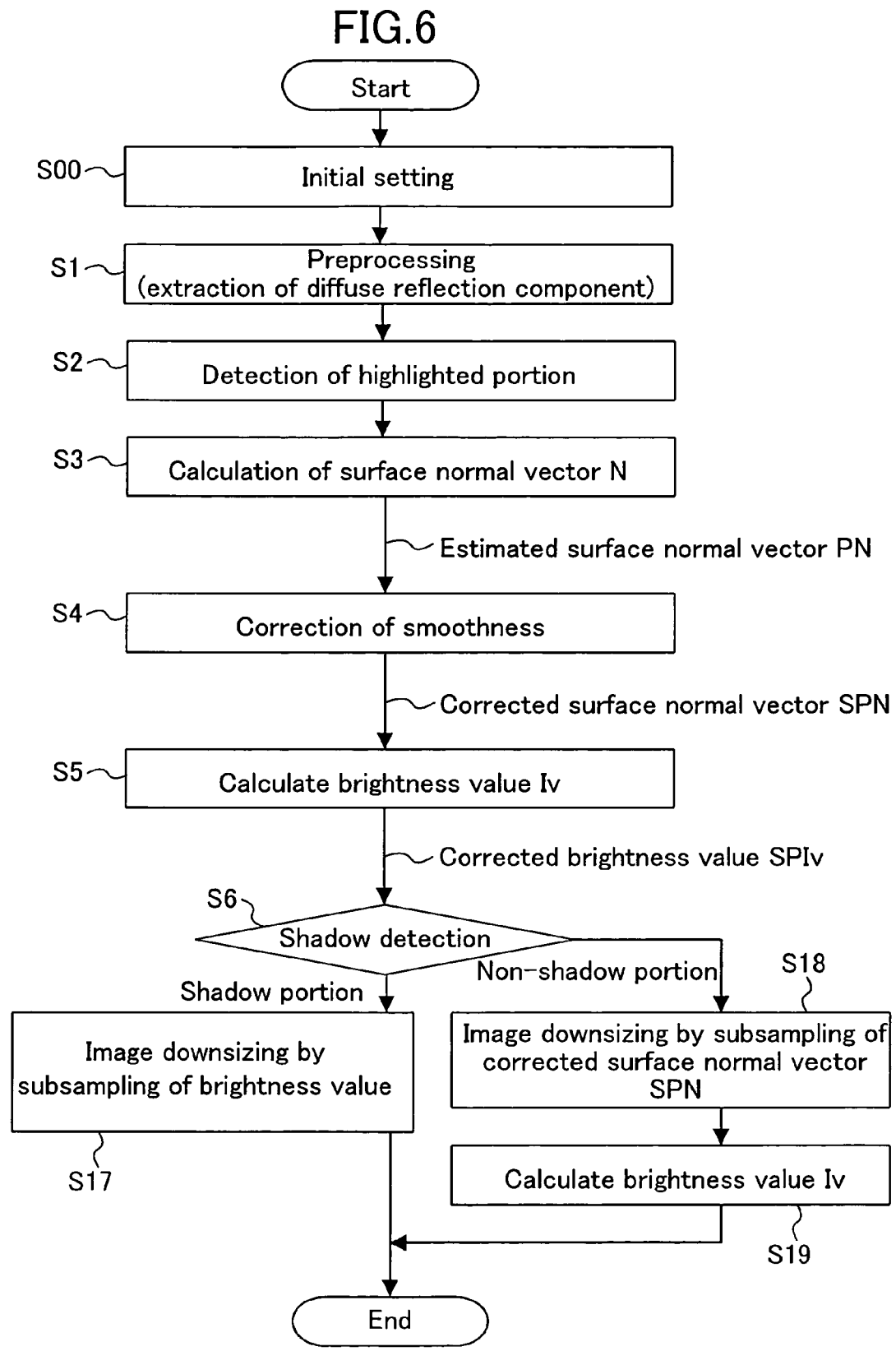

Before conversion

After conversion

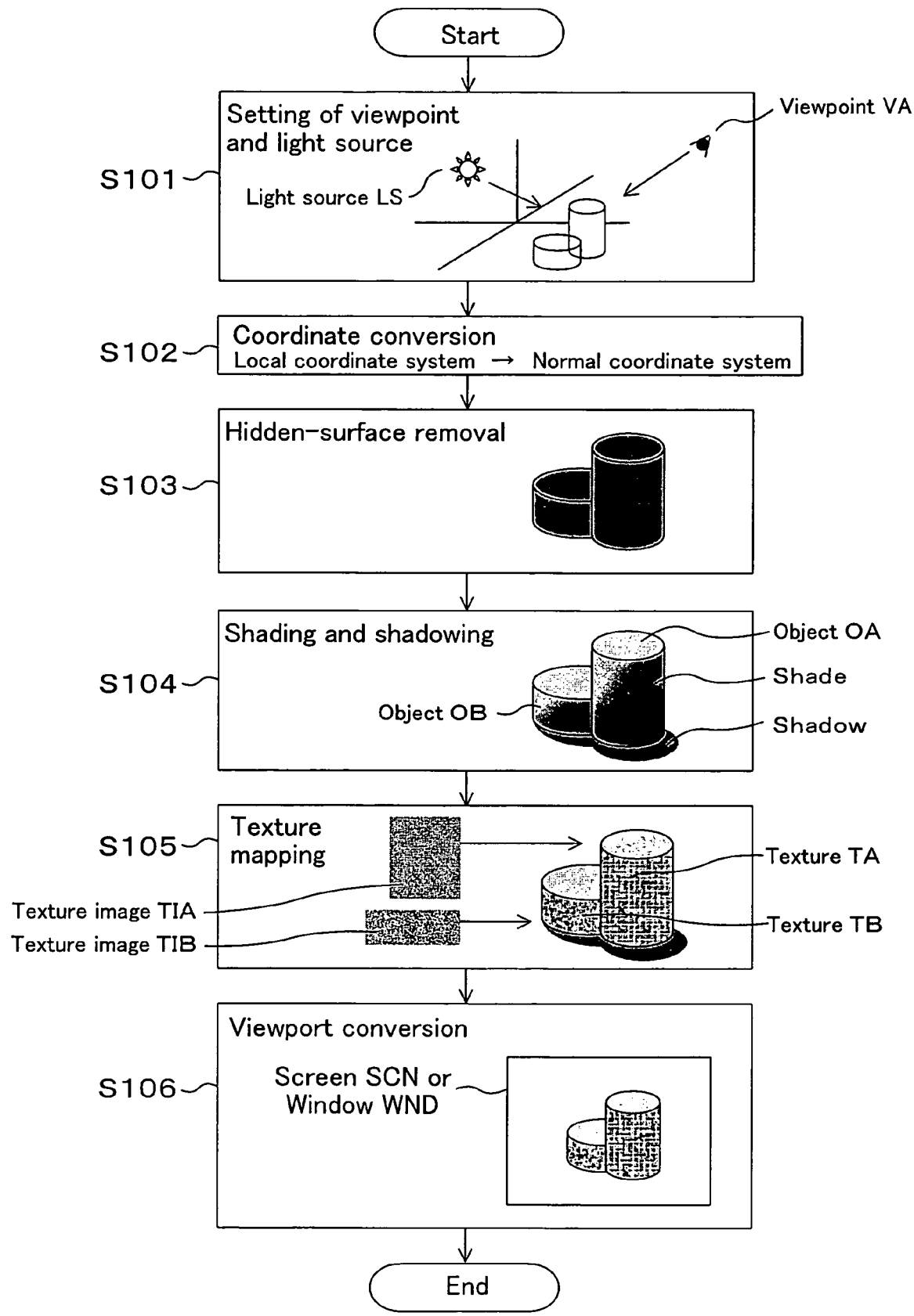

FIG.13
(a)
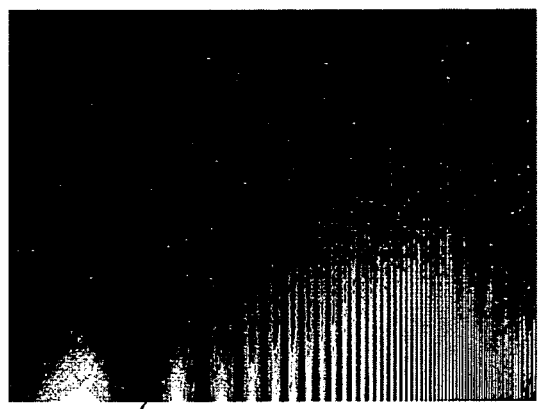
Test stimulus A
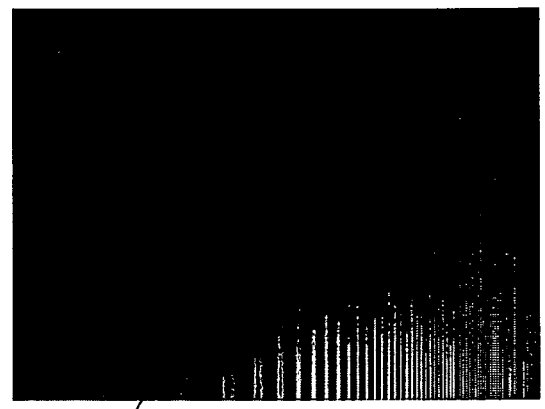
Test stimulus B
(b)
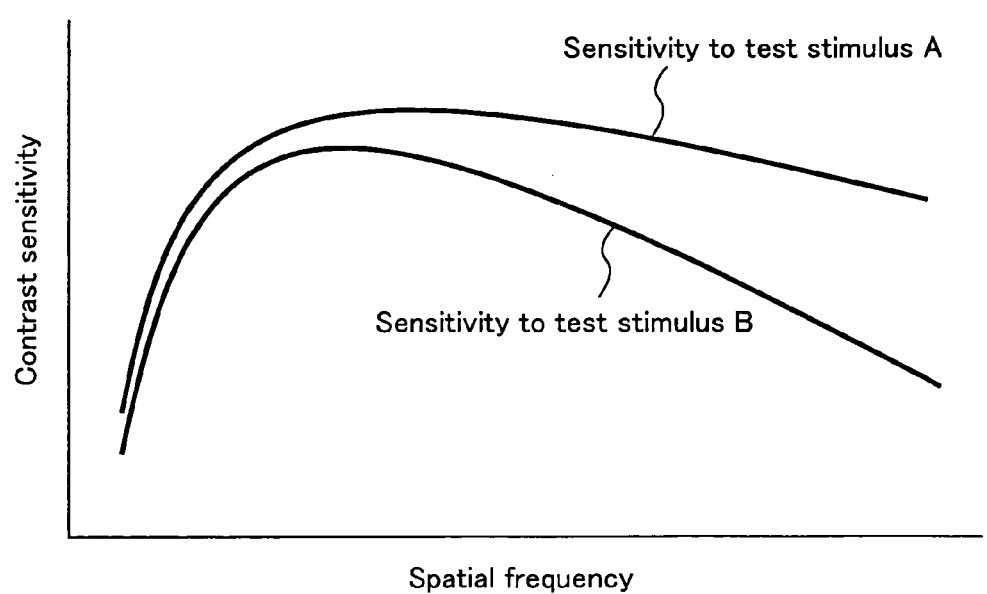

IMAGE CONVERSION METHOD, TEXTURE MAPPING METHOD, IMAGE CONVERSION DEVICE, SERVER-CLIENT SYSTEM, AND IMAGE CONVERSION PROGRAM

CROSS-REFERENCE TO RELATED APPLICATIONS

This is a continuation application of PCT/JP2005/023378 filed on Dec. 20, 2005 and claims priority under 35 U.S.C. §119(a) on Japanese Patent Application No. 2005-011817 filed on Jan. 19, 2005. In this specification, the entire contents of this prior application are hereby incorporated by reference.

BACKGROUND OF THE INVENTION

1. Technical Field

The present invention relates to image conversion and specifically to a technique for realizing image conversion, such as upsizing, downsizing, and the like, and texture mapping with the texture being maintained.

2. Background Art

Due to digitalization of image-related devices and networks, connection of any image-related devices has been possible, and the flexibility of image exchange has been improving. Further, an environment for users to freely handle images (pictures) without being restricted by difference in system has been constructed. For example, users can print images captured by a digital still camera, lay open the images on a network, and view the images on a household television set.

In the meanwhile, systems need to comply with various image formats and, naturally, a higher technique is required in image format conversions. For example, conversion of image size frequently occurs and, in such a case, an up-converter (converter for increasing the number of pixels or the number of lines) and down-converter (converter for decreasing the number of pixels or the number of lines) are necessary. For example, in the case of printing an image with the resolution of 600 dpi on an A4 (297 mm×210 mm) paper, a document of 7128 pixels×5040 lines is necessary, but many digital still cameras are short of this size, and therefore, an up-converter is necessary. On the other hand, an image laid open on a network does not have a definite final output form. Therefore, every time an output device is selected, the image needs to be converted to have an image size compliant with the selected output device. As for the household television set, since digital terrestrial broadcasting services have been started, conventional standard television images and HD (High Definition) television images are mixed. Thus, conversion of image size is frequently carried out.

Image conversion, such as image upsizing, image downsizing, and the like, is frequently employed for texture mapping in computer graphics (designs and patterns appearing on a photograph subject are generically referred to as "texture(s)"). Texture mapping is a method for expressing the patterns and textures on the surface of an object by placing two-dimensional images over the surface of a three-dimensional object created in a computer. To place the two-dimensional images so as to comply with the direction of the surface of the three-dimensional object, it is necessary to carry out processes, such as upsizing, downsizing, deformation, rotation, etc., on the two-dimensional images (see non-patent document 1).

Conventionally, the processes, such as image upsizing, image downsizing, etc., take advantage of the difference in brightness among a plurality of pixels.

In image upsizing, brightness values are interpolated according to a bilinear method, bicubic method, or the like, in order to newly generate image data which does not exist at the time of sampling (see non-patent document 1). In interpolation, only intermediate values of sampling data can be generated, and therefore, the sharpness of an edge, or the like, shows a tendency to deteriorate. In view of such, there has been a technique wherein an interpolated image is used as an initial upsized image and, thereafter, an edge portion is extracted to emphasize only the edge (disclosed in non-patent documents 2 and 3). Especially in non-patent document 3, multi-resolution representation and Lipschitz index are employed, such that an edge is selectively emphasized according to the sharpness of the edge.

In image downsizing, some pixels are deleted. Since the number of sampling points is decreased, the sampling frequency is also decreased. If the sampling frequency is smaller than the double of the highest frequency in an image (Nyquist frequency), aliasing occurs so that moire fringes are generated. To avoid such a problem, in general, the data is subjected to a low-pass filter before some pixels are deleted, whereby high frequency components are removed, and thereafter, the some pixels are deleted.

[Non-patent Document 1] Shinji Araya, *Clear commentary on* 3D *computer graphics*, Kyoritsu Shuppan Co., Ltd., pp. 144-145, Sep. 25, 2003.

[Non-patent Document 2] H. Greenspan, C. H. Anderson, "Image enhancement by non-linear extrapolation in frequency space", SPIE Vol. 2182 Image and Video Processing II, 1994.

[Non-patent Document 3] Makoto Nakashizuka, et al., "Image Resolution Enhancement on Multiscale Gradient Planes", The IEICE transactions (Japanese Edition), D-II Vol. J81-D-II No. 10 pp. 2249-2258, October 1998.

[Non-patent Document 4] *Image Processing Handbook* edited by Image Processing Handbook Editorial Committee, Shokodo Co., Ltd., pp. 392-407, Jun. 8, 1987.

[Non-patent Document 5] R. J. Woodham, "Photometric method for determining surface orientation from multiple images", Optical Engineering, vol. 19, pp. 139-144, 1980.

[Non-patent Document 6] Shinji Umeyama, "Separation of Diffuse and Specular Components of Surface Reflection—Using Multiple Observations through a Polarizer and Probabilistic Independence Property", Symposium on image recognition and understanding 2002, pp. 1-469- pp. I-476, 2002.

SUMMARY OF THE INVENTION

However, the conventional techniques have the following problems.

In the case where diffuse reflection components from a photograph subject are processed, when an image is upsized by linear interpolation of the brightness between pixels, the distribution of brightness is not necessarily coincident between the upsized image and the actual photograph subject. The reasons of this uncoincidence are briefly described below.

For example, the brightness value of diffusely reflected light, Id, is expressed as follows:

$$I_d = I_i \rho_d (\overline{N} \cdot \overline{L}) \qquad \text{Formula (1)}$$
$$= I_i \rho_d \cos\theta$$

where θ is an angle between the surface normal of the photograph subject and incident light from the light source. As seen from Formula (1), the brightness value of the diffusely reflected light, $I_d$, depends on the cosine of angle θ (non-patent document 1, p. 92). Image upsizing can be realized by increasing the density of the surface normal of the photograph subject by linear interpolation because the shape of the photograph subject itself does not change even after being upsized. However, an image obtained by linear interpolation of the brightness value has an error in brightness value from an actual image because, as described above, the brightness value of the diffusely reflected light depends on the cosine of the surface normal. Specifically, as shown in FIG. 12, line segment LN1 which is the cosine between 0 and 1 has an upwardly-convexed nonlinear characteristic and therefore has an error from line segment LN2 which is obtained by linear interpolation of the brightness value. This error is represented by line segment LN3 where the maximum value is 0.21. This error collapses the relationship in brightness value between adjacent pixels in an original image and apparently deteriorates the texture.

In view of the above problem, an objective of the present invention is to realize an image conversion with the texture being maintained through a simple process.

It has been said that the ability of the human visual system for sensing the contrast decreases as the brightness decreases. That is, the so-called contrast sensitivity decreases as the brightness decreases. In a shadow portion having a low brightness value, the human ability for distinguishing details decreases.

In test stimuli A and B shown in FIG. 13A, the spatial resolution gradually increases from the left side to the right side, and the contrast gradually decreases from the bottom to the top. Over these stimuli, a vertical position at which the light and dark pattern apparently disappears is specified, whereby the contrast sensitivity of the visual system is determined. It should be noted that the average brightness of test stimulus B is lower than that of test stimulus A. FIG. 13B is a graph illustrating the relationship between the spatial frequency and the contrast sensitivity, which is obtained using test stimuli A and B of FIG. 13A.

As seen from FIG. 13B, the contrast sensitivity of the visual system increases as the stimulus image is brighter, and the ability of the visual system for distinguishing details is increased. That is, in a bright region with a high brightness value, the contrast sensitivity is high. Therefore, the above-described error from the actual image, which is incurred by linear interpolation of the brightness value, constitutes a cause of deterioration in texture and is therefore nonnegligible. On the other hand, in a dark region with a low brightness value, the above-described error is not so noticeable and is therefore negligible.

In view of the above findings, according to the present invention, a conversion in a shadow portion having a low brightness value is carried out using the brightness value, while a conversion in a non-shadow portion having a high brightness value is carried out using the surface normal.

Thus, according to the present invention, a shadow portion is distinguished in a given first image. A first conversion process is carried out on the shadow portion using the brightness value of a pixel according to details of a predetermined image conversion. On the other hand, a second conversion process is carried out on a portion other than the shadow portion using the surface normal parameter which represents the surface normal of a photograph subject according to the details of a predetermined image conversion. Results of these processes are used to generate a second image.

According to the present invention, in a shadow portion of low brightness to which the human visual system exhibits low sensitivity, image conversion is carried out using the brightness value of a pixel. On the other hand, in a non-shadow portion of high brightness to which the human visual system exhibits high sensitivity, image conversion is carried out using the surface normal parameter. Therefore, image conversion can be realized with the texture being maintained while the increase of the processing load is suppressed.

According to the present invention, the processing mode is switched between a shadow portion and a non-shadow portion. In the shadow portion, image conversion is carried out using the brightness value. In the non-shadow portion, image conversion is carried out using the surface normal parameter. Therefore, the image conversion is realized while achieving both a small processing load and maintenance of the texture.

BRIEF DESCRIPTION OF THE DRAWINGS

FIG. 1A and FIG. 1B schematically illustrate the relationship between shadow and brightness distribution.

FIG. 6 is a flowchart illustrating an image conversion method according to embodiment 2 of the present invention.

FIG. 9 illustrates a flow of a rendering process according to embodiment 4 of the present invention.

FIG. 13A and FIG. 13B illustrate an example of the contrast sensitivity.

DESCRIPTION OF THE PREFERRED EMBODIMENTS

Figure 2:
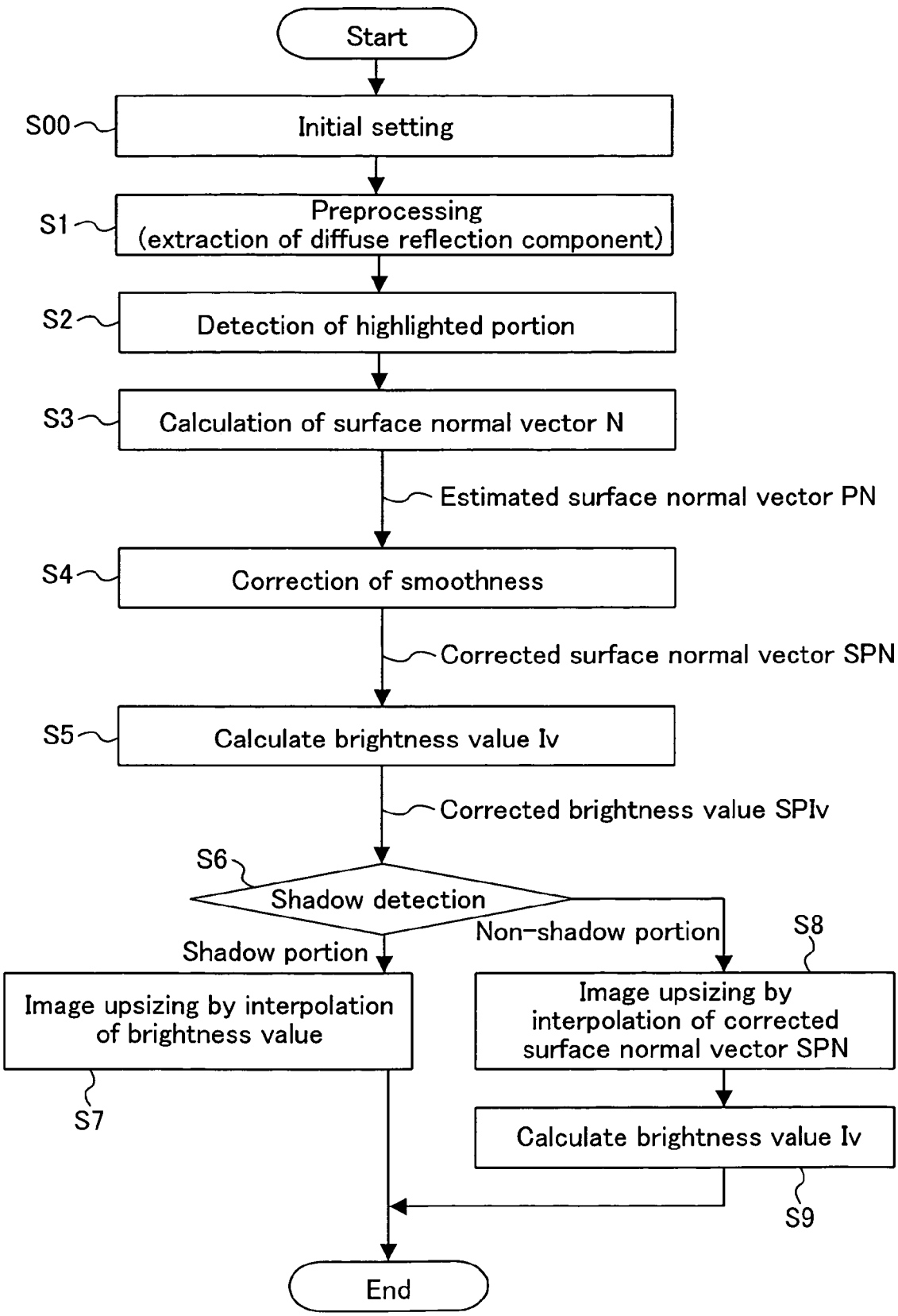
FIG. 2 is a flowchart illustrating an image conversion method according to embodiment 1 of the present invention.

According to the first aspect of the present invention, there is provided an image conversion method for performing a predetermined image conversion on a first image to generate a second image, comprising: a first step of distinguishing a shadow portion in the first image; a second step of performing a first conversion process on the shadow portion using a brightness value of a pixel according to details of the predetermined image conversion; and a third step of performing a second conversion process on a portion other than the shadow portion using a surface normal parameter which represents a surface normal of a photograph subject according to the details of the predetermined image conversion, wherein results of the processes performed at the second and third steps are used to generate the second image.

According to the second aspect of the present invention, the image conversion method of the first aspect further comprises a preprocessing step of processing the first image such that the first image is formed only by a diffuse reflection component.

According to the third aspect of the present invention, there is provided the image conversion method of the first aspect wherein: the predetermined image conversion is image upsizing; the first conversion process is a process of interpolating a brightness value to upsize an image; and the second conversion process is a process of interpolating a surface normal parameter to upsize an image.

According to the fourth aspect of the present invention, there is provided the image conversion method of the first aspect wherein: the predetermined image conversion is image downsizing; the first conversion process is a process of subsampling a brightness value to downsize an image; and the second conversion process is a process of subsampling a surface normal parameter to downsize an image.

According to the fifth aspect of the present invention, the image conversion method of the fourth aspect further comprises, before the third step, the step of correcting a surface normal parameter of the first image to smoothly change over spatial positions.

According to the sixth aspect of the present invention, there is provided the image conversion method of the first aspect wherein the first step includes the steps of: calculating a surface normal parameter of the first image; correcting the calculated surface normal parameter on the assumption that a photograph subject has a smooth surface; calculating a brightness value from the corrected surface normal parameter according to a predetermined illumination equation; and calculating, for each pixel, a difference between the calculated brightness value and an actual brightness value, and recognizing a pixel in which the difference is greater than a predetermined value as being the shadow portion.

According to the seventh aspect of the present invention, there is provided the image conversion method of the first aspect wherein the surface normal parameter is an angle between a surface normal and a light source direction.

According to the eighth aspect of the present invention, there is provided a texture mapping method, comprising: a preprocessing step of placing a texture image on a 3-dimensional CG model object; a first step of distinguishing a shadow portion in the texture image placed on the object; a second step of performing a first conversion process on the shadow portion using a brightness value of a pixel according to details of a predetermined image conversion; and a third step of performing a second conversion process on a portion other than the shadow portion using a surface normal parameter which represents a surface normal of a photograph subject according to the details of the predetermined image conversion, wherein results of the processes performed at the second and third steps are used to generate an image of the object.

According to the ninth aspect of the present invention, there is provided an image conversion device for performing a predetermined image conversion on a first image to generate a second image, comprising: a shadow distinguishing section for distinguishing a shadow portion in the first image; a first conversion section for performing a first conversion process on the shadow portion distinguished in the shadow distinguishing section using a brightness value of a pixel according to details of the predetermined image conversion; and a second conversion section for performing a second conversion process on a portion other than the shadow portion using a surface normal parameter which represents a surface normal of a photograph subject according to the details of the predetermined image conversion, wherein results of the processes performed by the first and second conversion sections are used to generate the second image.

According to the tenth aspect of the present invention, there is provided a server-client system for performing an image conversion, comprising: a server which includes the shadow distinguishing section of the ninth aspect; and a client which includes the first and second conversion sections of the ninth aspect.

According to the eleventh aspect of the present invention, there is provided an image conversion program which instructs a computer to perform a method for performing a predetermined image conversion on a first image to generate a second image, the method comprising: a first step of distinguishing a shadow portion in the first image; a second step of performing a first conversion process on the shadow portion using a brightness value of a pixel according to details of the predetermined image conversion; a third step of performing a second conversion process on a portion other than the shadow portion using a surface normal parameter which represents a surface normal of a photograph subject according to the details of the predetermined image conversion; and a fourth step of generating the second image using results of the processes performed at the second and third steps.

Hereinafter, embodiments of the present invention will be described with reference to the drawings.

First, a method for distinguishing a shadow portion is described with reference to FIG. 1A and FIG. 1B. FIG. 1A and FIG. 1B schematically illustrate an image detected when a photograph subject having an undulated surface is irradiated with light and the brightness distribution thereof. In the examples of FIG. 1A and FIG. 1B, the shape of the surface of the photograph subject smoothly changes from a peak, a trough, and another peak.

When light from a light source LS right above falls vertically onto a photograph subject (case A), shadow is not generated at any position over the surface of the photograph subject. Therefore, by determining the surface normal from the brightness distribution according to Formula (1), the shape of the surface of the photograph subject is correctly calculated. When light from the light source LS falls obliquely from the left side at 45° onto the photograph subject (case B), shadow is generated on the left side of the trough (shadow SH). In the brightness distribution chart, discontinuous changes occur as seen at positions DC1 and DC2. Thus, when the surface normal is determined from the brightness distribution according to Formula (1), the calculated shape of the surface of the photograph subject involves discontinuities at positions the DC1 and DC2. This is because Formula (1) is a model constructed based on an assumption that shadow is not included. Specifically, when the surface normal is determined from the brightness distribution, an image including a shadow portion results in an inconsistency, i.e., discontinuity in surface normal.

This knowledge is utilized in the embodiments of the present invention. For example, an assumption is given that the shape of the surface of the photograph subject smoothly changes, and if this assumption of smoothness is negated, it is determined to be a shadow portion. Specifically, the surface normal is calculated from the brightness value of an original image according to Formula (1), and the surface normal is corrected based on the assumption of smoothness. Then, the brightness value is re-calculated from the corrected surface normal according to Formula (1). If the re-calculated brightness value is different from the brightness value of the original image, the corresponding portion is determined to be a shadow portion.

Embodiment 1

FIG. 2 is a flowchart illustrating an image conversion method according to embodiment 1 of the present invention. According to embodiment 1, image upsizing is carried out as the predetermined image conversion on a given first image to generate a second image. It should be noted that the image conversion method of embodiment 1 can be implemented by executing a program for carrying out the method on a computer.

Figure 3:
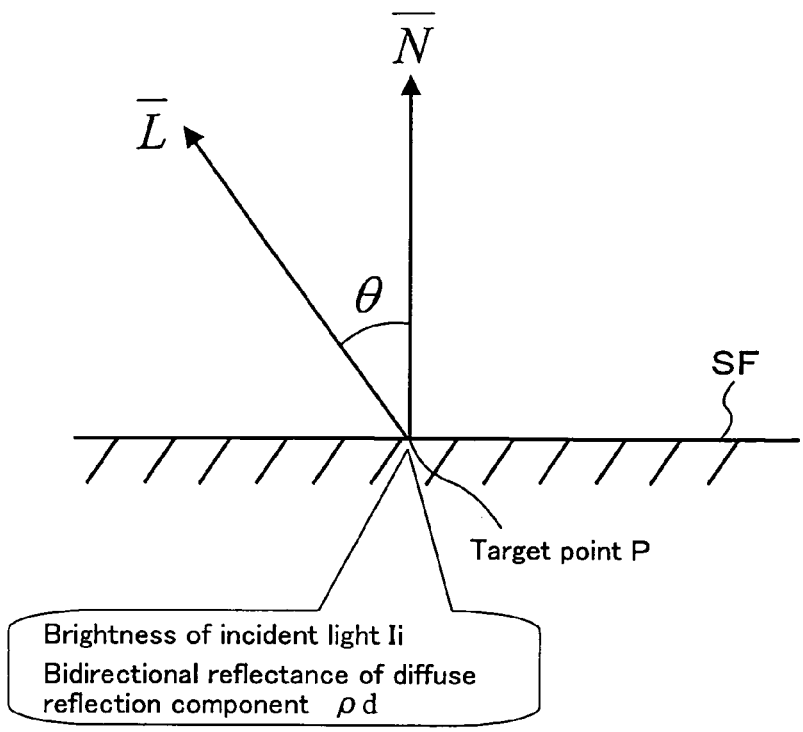
FIG. 3 is a concept diagram illustrating presuppositional geometric conditions and optical conditions.

At step S00, the initial setting is carried out. FIG. 3 schematically illustrates geometric conditions for a target point P on a surface SF of a photograph subject. At step S00, the light source vector, L, the brightness of incident light at the target point, $I_i$, and the bidirectional reflectance of the diffuse reflection component of the photograph subject, $\rho_d$, shown in FIG. 3 are acquired. Herein, the light source vector, L, the brightness of incident light, $I_i$, and the bidirectional reflectance, $\rho_d$, are assumed to be determined in advance. Herein, highlighted portion determination threshold THH, which is used at step S2 (described later), is also determined.

As step S1, preprocessing is carried out to obtain a first image formed only by diffuse reflection components. Although light reflected from the photograph subject generally includes mirror reflection components and diffuse reflection components, the present invention is directed only to the diffuse reflection components and, therefore, pixels in which only the diffuse reflection components are captured are extracted, or only the diffuse reflection components are captured and recorded as the first image.

Figure 4:
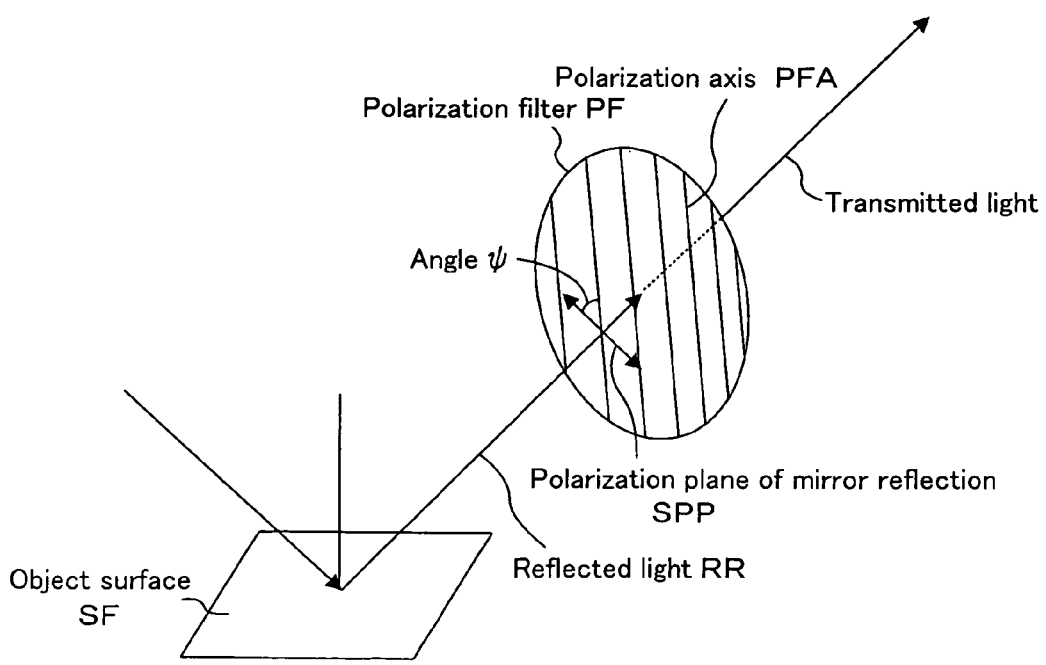
FIG. 4 illustrates an example of a method for measuring a surface normal vector.

As for the method for separating the diffuse reflection and the mirror reflection, for example, non-patent document 6 discloses the technique of utilizing polarization of the mirror reflection component. When light is reflected by an object surface, the Fresnel coefficient is generally different between an electric field component parallel to the incidence/reflection surface of the light and an electric field component perpendicular to the incidence/reflection surface. Therefore, the reflected light polarizes. Although the mirror reflection component polarizes in general, the diffuse reflection is irregular reflection and thus has no polarization characteristic. In the case where reflected light RR is observed through a polarization filter PF as shown in FIG. 4, the intensity of transmitted light RRP is the intensity of a component of the reflected light RR which is parallel to the polarization axis PFA of the polarization filter PF. Thus, in the case where the mirror reflection component from the object surface SF is observed while the polarization filter PF is rotated, the intensity of the transmitted light RRP varies according to angle ψ between the polarization axis PFA of the polarization filter PF and a polarization plane SPP of the mirror reflection as expressed by the following formula (2):

$$L(\psi) = L_d + \frac{1}{4}\{F_V(\theta'_i) + F_P(\theta'_i) - (F_V(\theta'_i) - F_P(\theta'_i))\cos 2\psi\}L_s \quad \text{Formula (2)}$$

where $L_d$ is the brightness of the diffuse reflection component, $L_s$ is the brightness of the mirror reflection component, $\theta'_i$ is the incident angle of light at a small reflection surface, $F_P$ is the Fresnel coefficient of a parallel field component for dielectric, and $F_V$ is the Fresnel coefficient of a perpendicular field component for dielectric.

Then, at step S2, a highlighted portion of the first image is detected. The highlighted portion herein means a pixel having the maximum brightness. In the brightness distribution of FIG. 1A and FIG. 1B, positions HL1, HL2, HL3 and HL4 correspond to highlighted portions. In the highlighted portions, the surface normal is identical with the direction of incident light from the light source LS (i.e., light source vector L in FIG. 3). Since light source vector L is given at step S00, the surface normal vectors of the highlighted portions are also already known.

It should be noted that a captured image generally includes noise and, therefore, in each highlighted portion (for example, at positions HL1 to HL4), the brightness is rarely identical. Therefore, in the case of detecting a highlighted portion, it is preferable that the extent of the brightness value range have some margin. Accordingly, for example, 95% of maximum brightness $I_d$max in an image is defined as highlighted portion determination threshold THH, and a pixel whose brightness value is higher than threshold THH is detected as a highlighted portion.

Then, at step S3, estimated surface normal vector PN is calculated from the brightness value of the first image according to Formula (1). Angle θ between the surface normal and the light source direction (or cosine cos θ) is used as the surface normal parameter which represents the surface normal (vector). When the brightness value of the first image is equal to maximum brightness $I_d$max, light source vector L is identical with surface normal vector N, so that the inner product of these vectors is 1, i.e., the maximum. Thus, the brightness value of diffusely reflected light, $I_d$, is normalized by maximum brightness $I_d$max.

Figure 5A:
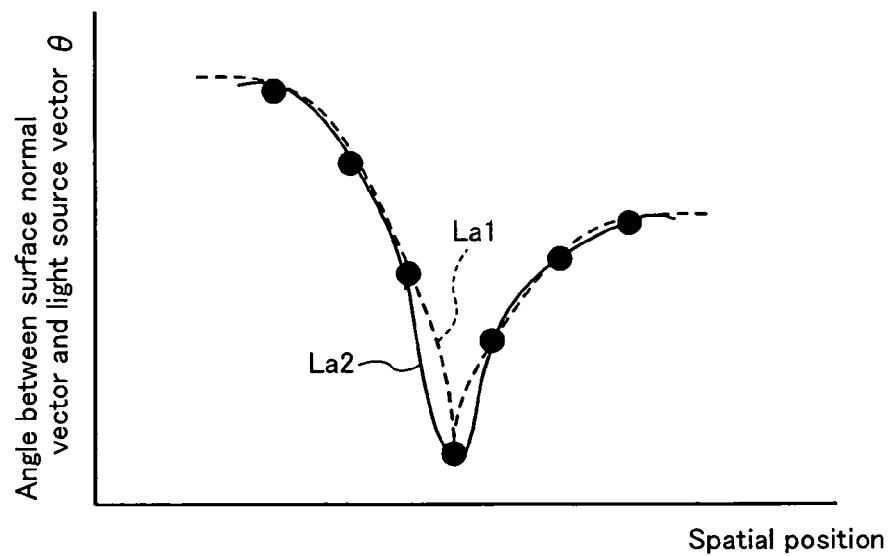
FIG. 5A and FIG. 5B conceptually illustrate the process of correcting the surface normal vector.
Figure 5B:
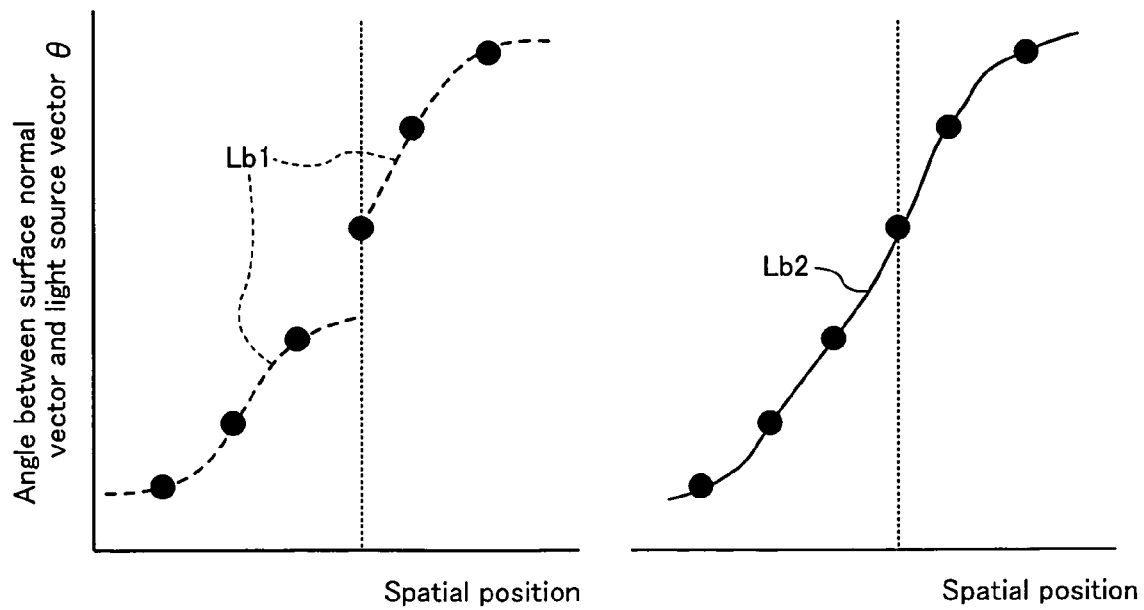

At step S4, estimated surface normal vector PN is corrected as to smoothness between adjacent pixels, and corrected surface normal vector SPN is calculated. Specifically, the surface normal parameter is corrected so as to smoothly change over spatial positions. FIG. 5A and FIG. 5B conceptually illustrate the correction process of step S4. In the example of FIG. 5A, Change La1 involving a turnup is corrected to Change La2 having a smooth curve. In the example of FIG. 5B, Change Lb1 involving a leap is corrected to Change Lb2 that smoothly continues.

Herein, estimated surface normal vector PN is highly reliable except for the shadow portions, and therefore, the correction at this step is desirably carried out with as many non-shadow portions as possible. However, the correction method itself is arbitrary and nonlimiting. A typical example is spline interpolation. There have been developed various models of the shape of the photograph subject in the fields of computer graphics, including an expression method with a free-form surface based on Bezier curve, NURBS curve, etc., (non-patent document 1, pp. 36-38). According to the present invention, in the process of generating an upsized image, the brightness value is interpolated in a shadow portion while the corrected surface normal itself is not utilized. Since at this step the surface normal is calculated for the purpose of detecting a shadow portion, i.e., it is important whether an image is shadowy or not, it is not intended to calculate the accuracy of each corrected surface normal.

At step S5, the brightness value of the diffusely reflected light, $I_v$, is calculated from corrected surface normal vector SPN according to Formula (1) and output as corrected brightness value SPIv.

At step S6, corrected brightness value SPIv is compared with the brightness value of the first image. A pixel region in which the brightness values are different is determined to be a shadow portion, while a pixel region in which the brightness values are equal is determined to be a non-shadow portion. Alternatively, a tolerance may be provided to the difference between corrected brightness value SPIv and the brightness value of the first image (for example, about 0.01 when the brightness value is normalized to a value in the range of 0 to 1). In this case, if the difference between corrected brightness value SPIv and the brightness value of the first image exceeds the tolerance, it is determined to be a shadow portion. It should be noted that steps S2 to S6 correspond to the first step of the claimed inventions.

As for part of the image which has been determined to be a shadow portion, the brightness value of the first image is interpolated to upsize the image at step S7 (corresponding to the second step of the claimed inventions). On the other hand, as for part of the image which has been determined to be a non-shadow portion, corrected surface normal vector SPN is interpolated to upsize the image at step S8. At step S9, the brightness value of the diffusely reflected light, $I_v$, is calculated from the corrected surface normal vector upsized by interpolation according to Formula (1). Steps S8 and S9 correspond to the third step of the claimed inventions. Although the present invention is arranged such that linear interpolation which incurs a light processing load can be employed as the interpolation method, it is not intended to limit the interpolation method itself.

The process results of step S7 and steps S8 and S9 are used to generate a second image.

Thus, according to the present invention, an image upsizing is carried out such that the brightness is linearly interpolated in a shadow portion of low brightness to which the human visual system exhibits low sensitivity, while the surface normal is linearly interpolated in a non-shadow portion of high brightness to which the human visual system exhibits high sensitivity. With such a switchable process, an image upsizing can be realized while achieving both a light processing load and maintenance of the texture.

In a non-shadow portion in which the surface normal is necessary, the surface normal is estimated from the brightness value of a pixel. Therefore, an image upsizing can be realized with the texture being maintained only from information captured from a photograph subject without using a special device. For example, the surface normal of a photograph subject can be measured using a range finder or can be calculated using a photometric stereo method. However, the range finder is limited in respect of the variety of situations in which it can be used because of the size of the device, the size of a photograph subject, etc., i.e., disadvantageous in respect of the versatility (see non-patent document 4). As to the photometric stereo method, if a photograph subject surface is shadowy, calculation of the surface normal is impossible in principle (see non-patent document 5). Thus, this method is required to avoid generation of shadow at a measurement point by, for example, changing the orientation of the photograph subject or changing the position of the light source, and is therefore practically unsuitable. Comparing with such conventional techniques, embodiment 1 of the present invention is advantageous in that the surface normal can be calculated only from captured information without using a special device.

It should be noted that an image conversion device may be constructed which includes a shadow distinguishing section for performing steps S2 to S6, a first conversion section for performing step S7, and a second conversion section for performing steps S8 and S9.

Embodiment 2

FIG. 6 is a flowchart illustrating an image conversion method according to embodiment 2 of the present invention. In embodiment 2, image downsizing is carried out as the predetermined image conversion on a given first image to generate a second image. It should be noted that the image conversion method of embodiment 2 can be implemented by executing a program for carrying out the method on a computer. It should also be noted that an image conversion device may be constructed which includes a shadow distinguishing section for performing steps S2 to S6, a first conversion section for performing step S17, and a second conversion section for performing steps S18 and S19.

In the flowchart of FIG. 6, the processes of steps S00 and S1 to S6 are the same as those of the flowchart of FIG. 2 and, therefore, the descriptions thereof are herein omitted.

As for part of the image which has been determined to be a shadow portion at step S6, the brightness value of the first image is subsampled to downsize the first image at step S17 (corresponding to the second step of the claimed inventions). In the shadow portion, the contrast sensitivity of the human visual system is low, and therefore, degradation of the texture which is caused by moire fringes is less as compared with a non-shadow portion.

On the other hand, as for part of the image which has been determined to be a non-shadow portion at step S6, corrected surface normal vector SPN is subsampled to downsize the first image at step S18. Then, at step S19, the brightness value of the diffusely reflected light, $I_v$, is calculated from the subsampled corrected surface normal vector according to Formula (1). Steps S18 and S19 correspond to the third step of the claimed inventions.

It should be noted that a decrease in the number of sampling points, which accompanies the image downsizing, causes a decrease in the Nyquist frequency, and as a result, the possibility of generation of moire fringes increases. However, according to embodiment 2, the surface normal parameter is corrected at step S4 to smoothly change over the spatial positions. Therefore, the high-frequency components are suppressed, so that generation of moire fringes is suppressed. That is, step S4 serves as a preprocessing step for the subsampling of the surface normal parameter. This preprocessing avoids the necessity of using an additional low pass filter which would be required in the conventional techniques.

As described above, according to embodiment 2, the brightness is subsampled in a shadow portion of low brightness to which the human visual system exhibits low sensitivity, while the surface normal is subsampled in a non-shadow portion of high brightness to which the human visual system exhibits high sensitivity, whereby an image downsizing is realized with suppressed generation of moire fringes. With such a switchable process, an image downsizing can be realized while achieving both a light processing load and maintenance of the texture. In a non-shadow portion in which the surface normal is necessary, the surface normal is estimated from the brightness value of a pixel. Therefore, an image downsizing can be realized with the texture being maintained only from captured information without using a special device.

Embodiment 3

Figure 7:
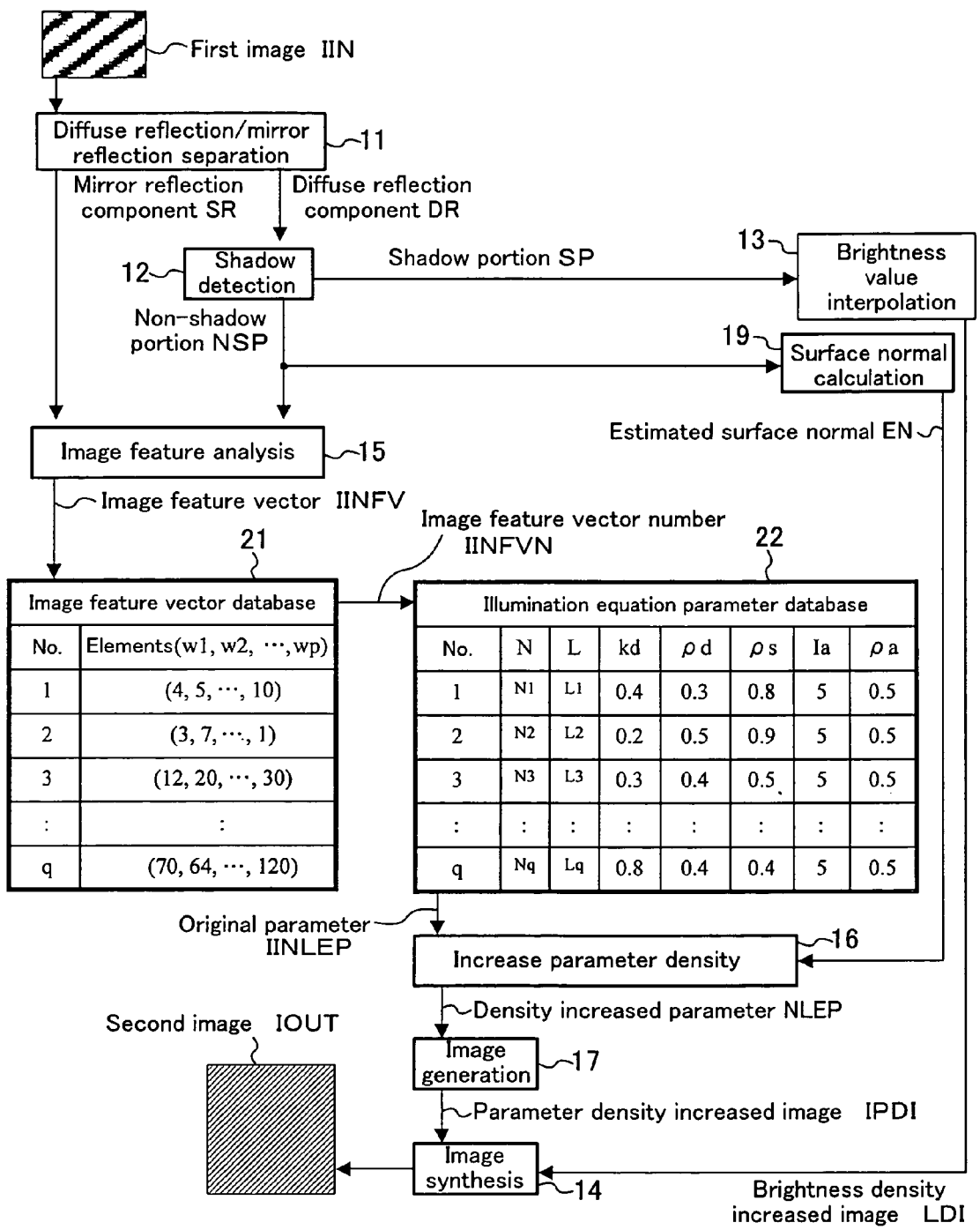
FIG. 7 is a block diagram illustrating a structure example which realizes an image conversion method according to embodiment 3 of the present invention.

FIG. 7 is a block diagram illustrating a structure example which realizes an image conversion method according to embodiment 3 of the present invention. In embodiment 3, image upsizing is carried out as the predetermined image conversion on given first image IIN to generate second image IOUT. It should be noted that the image conversion method of embodiment 3 can be implemented by executing a program for carrying out the method on a computer.

First image IIN is separated by a diffuse reflection/mirror reflection separating section 11 into mirror reflection component SR and diffuse reflection component DR. The diffuse reflection/mirror reflection separating section 11 performs the same process as that of above-described step S1. For example, the method illustrated in FIG. 4 which utilizes optical polarization (see non-patent document 6) is employed. Diffuse reflection component DR is separated by a shadow detecting section 12 into shadow portion SP and non-shadow portion NSP. The shadow detecting section 12 performs the same processes as those of above-described steps S2 to S6. The density of shadow portion SP is spatially increased by a brightness value interpolating section 13. An image synthesizing section 14 synthesizes brightness density increased image LDI output from the brightness value interpolating section 13 and parameter density increased image IPDI (described later) to generate second image IOUT. Parameter density increased image IPDI is generated by spatially increasing the density of non-shadow portion NSP of the diffuse reflection component and the density of mirror reflection component SR.

Mirror reflection component SR and non-shadow portion NSP are converted to image feature vector IINFV by an image feature analysis section 15. In the image feature analysis section 15, the spatial response characteristics obtained by, for example, wavelet transformation, or the like, are employed. The image feature vector database 21 selects an image feature vector which has the highest similarity to image feature vector IINFV and outputs image feature vector number IINFVN corresponding to the selected image feature vector. The illumination equation parameter database 22 receives image feature vector number IINFVN and outputs an illumination equation parameter corresponding to number IINFVN as original parameter IINLEP. A typical example of the illumination equation used is:

$$I_v = \rho_a I_a + I_i(\overline{N} \cdot \overline{L}) d\omega (k_d \rho_d + k_s \rho_s)$$  Formula (3)

where $I_a$ is the brightness of ambient light, $\rho_a$ is the reflectance of ambient light, $I_i$ is the brightness of illumination, vector N is the surface normal vector, vector L is the light source vector which represents the light source direction, $d\omega$ is the solid angle of the light source, $\rho_d$ is the bidirectional reflectance of the diffuse reflection component, $\rho_s$ is the bidirectional reflectance of the mirror reflection component, $k_d$ is the proportion of the diffuse reflection component, and $k_s$ is the proportion of the mirror reflection component, which are in the relationship of $k_d + k_s = 1$.

Figure 8A:
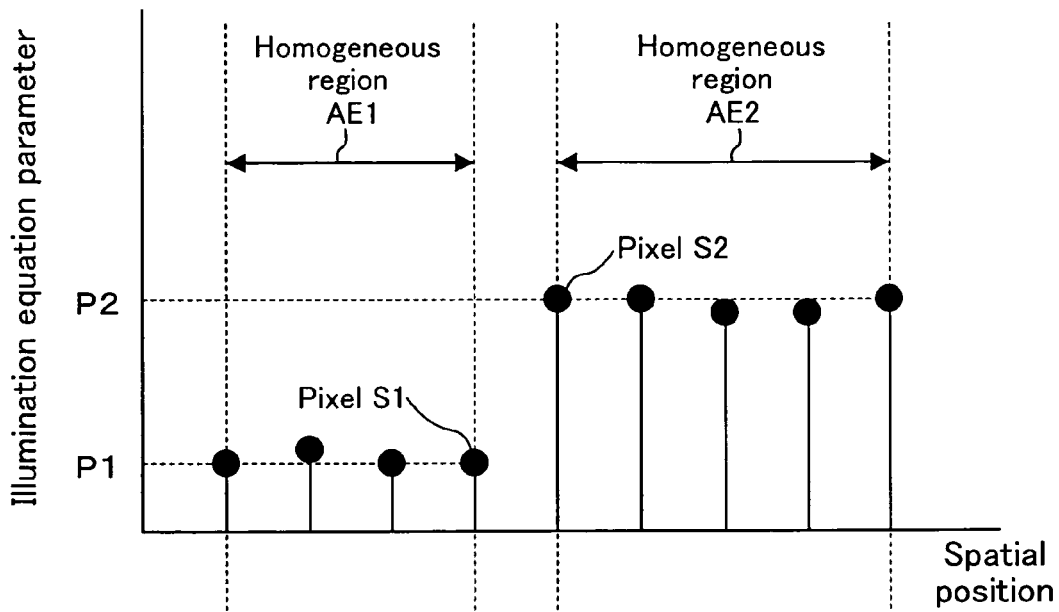
FIG. 8A and FIG. 8B illustrate the process of increasing the density of a parameter.
Figure 8B:
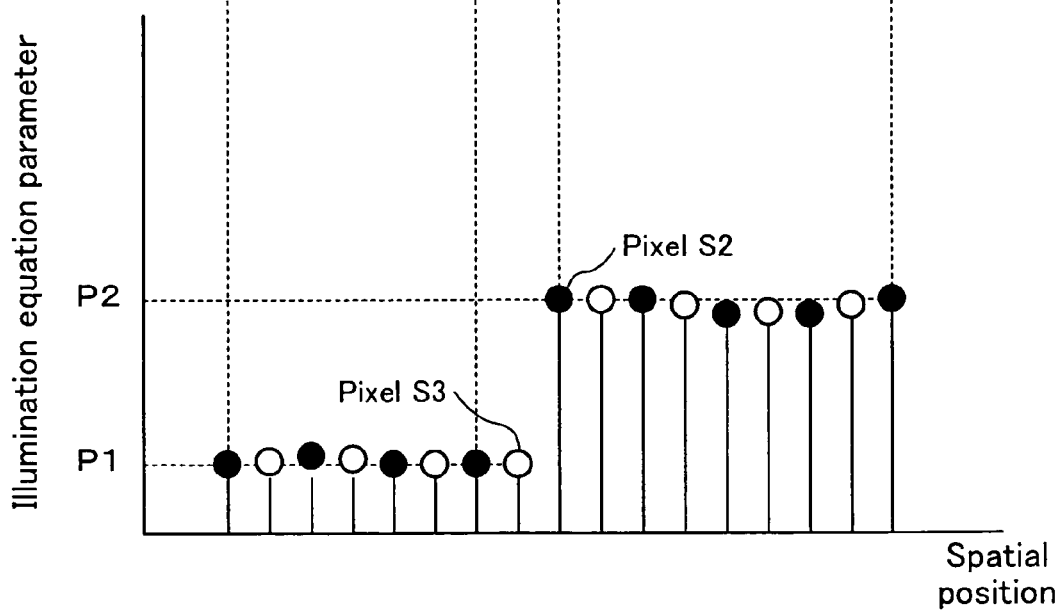

The density of original parameter IINLEP is spatially increased by a parameter density increasing section 16. For example, as shown in FIG. 8A and FIG. 8B, neighboring pixels having similar values as to an illumination equation parameter are grouped in a homogeneous region, and the density of the illumination equation parameter is increased in the homogeneous region. In the example shown in FIG. 8A and FIG. 8B, a homogeneous region AE1 where the average attribute value of pixels (indicated by black circles) is P1 and a homogeneous region AE2 where the average attribute value of pixels is P2 adjoin each other. The difference in brightness between pixels S1 and S2 residing at the boundary between the homogeneous regions AE1 and AE2 forms an edge. To upsize the image including the distribution of FIG. 8A by a factor of 2, for example, pixels (indicated by white circles) are inserted between pixels (indicated by black circles) as shown in FIG. 8B. The attribute value of each of the inserted pixels (white circles) is, for example, equal to the average attribute value of black circle pixels neighboring the inserted pixel. Further, a new pixel S3 is generated between the pixels S1 and S2 which form the edge such that the pixel S3 has an attribute value equal to that of the pixel S1 or S2. In the example of FIG. 8B, the attribute value of the pixel S1 is copied to the pixel S3, such that the difference in brightness between the pixels S2 and S3 is equal to the difference in brightness between the pixels S1 and S2 in FIG. 8A. As a result, the edge is maintained even after the density is increased.

Original parameter IINLEP includes surface normal vector N, which is substantially equal to estimated surface normal EN calculated by a surface normal calculating section 19 from the brightness value of non-shadow portion NSP. Since the illumination equation parameter database 22 discretely holds data in view of the data capacity, it is deduced that, for example, estimated surface normal EN calculated according to Formula (1) has a small error from the true value as compared with surface normal vector N. Thus, among the illumination equation parameters, as for surface normal vector N, it is preferable to use estimated surface normal EN rather than original parameter IINLEP.

Density increased parameter NLEP output from the parameter density increasing section 16 is converted by an image generating section 17 back to a brightness value and output as parameter density increased image IPDI. Then, as described above, the image synthesizing section 14 synthesizes brightness density increased image LDI and parameter density increased image IPDI to generate second image IOUT.

An image downsizing can also be likewise performed in which subsampling of the brightness value is carried out in place of interpolation of the brightness value, and the parameter density is decreased in place of increasing the parameter density.

Embodiment 4

In embodiment 4 of the present invention, the above-described image conversion method is applied to texture mapping in computer graphics.

FIG. 9 is a flowchart which illustrates a primary flow of a rendering process. The rendering process herein means, in computer graphics, the process of converting a 3-dimensional model created in a computer to 2-dimensional image data (see, for example, non-patent document 1, p. 79). As shown in FIG. 9, the rendering process includes, as the main steps, setting of a viewpoint and a light source (S101), coordinate conversion (S102), hidden-surface removal (S103), shading and shadowing (S104), texture mapping (S105), and viewport conversion (S106).

First, at step S101, a viewpoint VA and a light source LS are set so that the appearance of objects is determined. Then, at step S102, objects managed in respective local coordinate systems are transplanted into a normal coordinate system. At step S103, surfaces which are hidden from the viewpoint VA are deleted. At step S104, the incidence of light from the light source LS onto objects OA and OB is calculated, and Shade and Shadow are generated.

At step S105, texture mapping is performed to generate textures TA and TB for the objects OA and OB. In general, a texture is acquired together with image data. A texture image TIA is deformed according to the shape of the object OA and synthesized on the object OA. Likewise, a texture image TIB is deformed according to the shape of the object OB and synthesized on the object OB.

In embodiment 4, the above-described image conversion is applied to this texture mapping. Specifically, first, pre-processing is carried out wherein the texture images TIA and TIB are placed on the objects OA and OB of 3-dimensional model, respectively. Then, the process is carried out according to the flow of FIG. 2. At step S00, the optical parameters of the 2-dimensional texture images TIA and TIB, and the parameters as shown in FIG. 3 for every pixel of the 2-dimensional texture images TIA and TIB placed on the objects OA and OB, are acquired. The subsequent steps are the same as those of embodiment 1.

Lastly, at step S106, the viewport conversion is performed to generate a 2-dimensional image which has an image size adjusted to a displayed screen SCN or window WND.

Herein, the rendering process needs to be performed because the viewpoint and the position of the light source are changed. In an interactive system, such as a game machine, the rendering process is frequently repeated. In texture mapping, generally, texture data which is to be placed on a surface of an object is prepared in the form of an image. Thus, if the viewpoint or light source is changed, the texture data needs to be transformed by upsizing, downsizing, rotation, color change, or the like, at every such occasion.

As described above, in the image conversion based only on the brightness value, it is difficult to create a new image while maintaining the texture. On the other hand, according to the present invention, interpolation or subsampling of the brightness value is carried out in a shadow portion, while interpolation or subsampling of the surface normal is carried out in a non-shadow portion. Accordingly, texture mapping adapted to various viewpoints and light source settings can be realized while the texture is maintained.

Hereinafter, structure examples for implementing the present invention will be described.

First Structure Example

Figure 10:
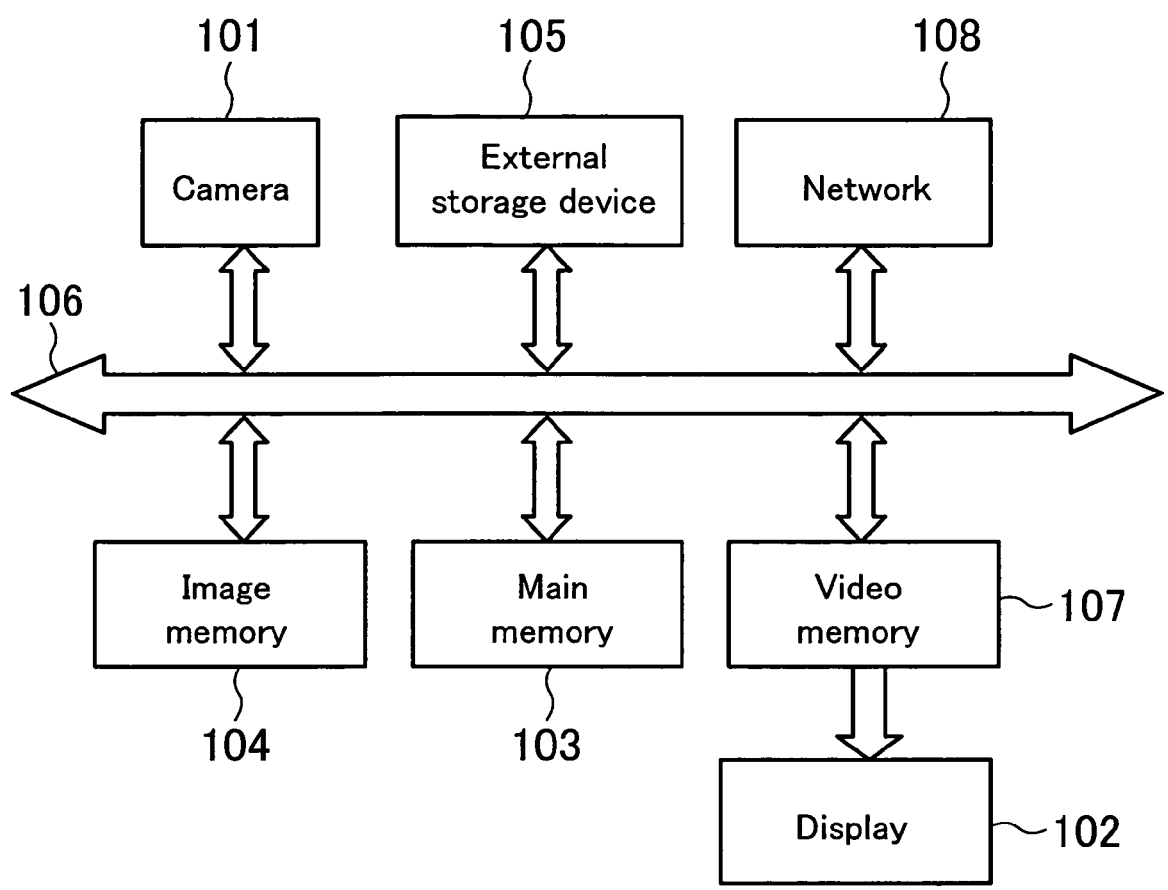
FIG. 10 illustrates the first structure example for implementing the present invention which uses a personal computer.

FIG. 10 illustrates the first structure example wherein the image conversion according to the present invention is carried out using a personal computer. Herein, the resolution of a camera 101 is lower than that of a display 102. To make full use of the display capacity of the display 102, an upsized image is generated using an image conversion program loaded into a main memory 103. A low-resolution image captured by the camera 101 is recorded in an image memory 104. Light source vector L, the brightness of incident light at the target point, $I_i$, the bidirectional reflectance of the diffuse reflection component of the photograph subject, $\rho_d$, and highlighted portion determination threshold THH are prepared in advance in an external storage device 105. These values can be referred to by the image conversion program of the main memory 103.

The process of the image conversion program is the same as that of embodiment 1. A shadow portion is distinguished in a camera image. The brightness value is linearly interpolated in the shadow portion, while the surface normal is linearly interpolated in a portion other than the shadow portion. Specifically, a low-resolution image is read from the image memory 104 through a memory bus 106 and converted to a high-resolution image so as to comply with the resolution of the display 102. The high-resolution image is transferred to a video memory 107 through the memory bus 106 again. The high-resolution image transferred to the video memory 107 is displayed on the display 102.

The present invention is not limited to the structure of FIG. 10 but may have any of various structures. For example, light source vector L, the brightness of incident light, $I_i$, and the bidirectional reflectance of the diffuse reflection component of the photograph subject, $\rho_d$, may be measured directly from a photograph subject using a measurement device. Further, a low-resolution image may be acquired through a network 108. The texture mapping described in embodiment 4 may be performed in the main memory 103 while texture data is stored in the external storage device 105.

When the resolution of the camera 101 is higher than that of the display 102, the image conversion program loaded into the main memory 103 may execute image downsizing as described in embodiment 2. The camera 101 may be any type of image capturing device, such as a camera mobile phone, digital still camera, video movie camera, or the like. Furthermore, the present invention can be implemented in a reproduction device for reproducing a movie which has been recorded in advance.

Second Structure Example

Figure 11:
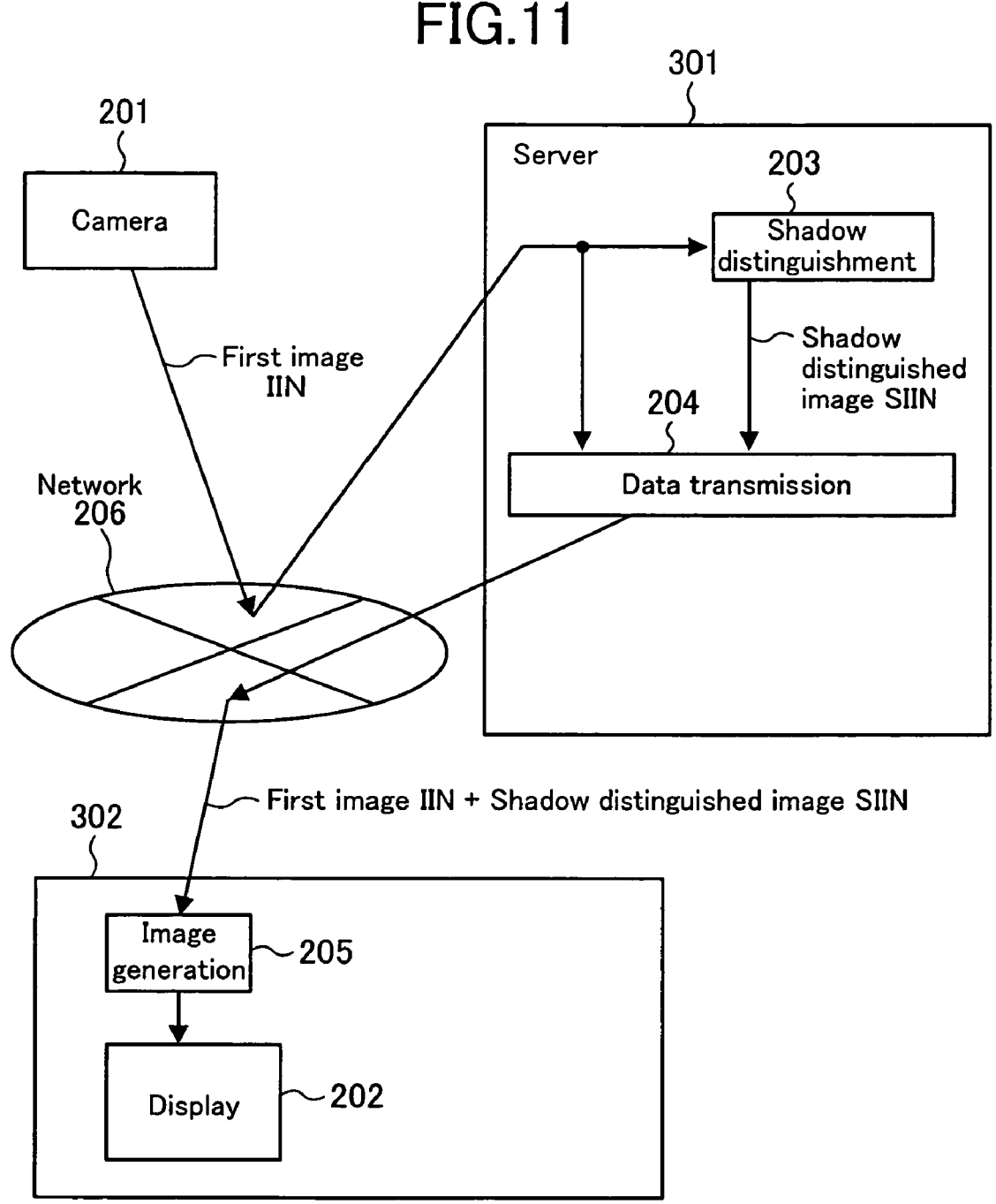
FIG. 11 illustrates the second structure example for implementing the present invention which uses a server-client system.
Figure 12:
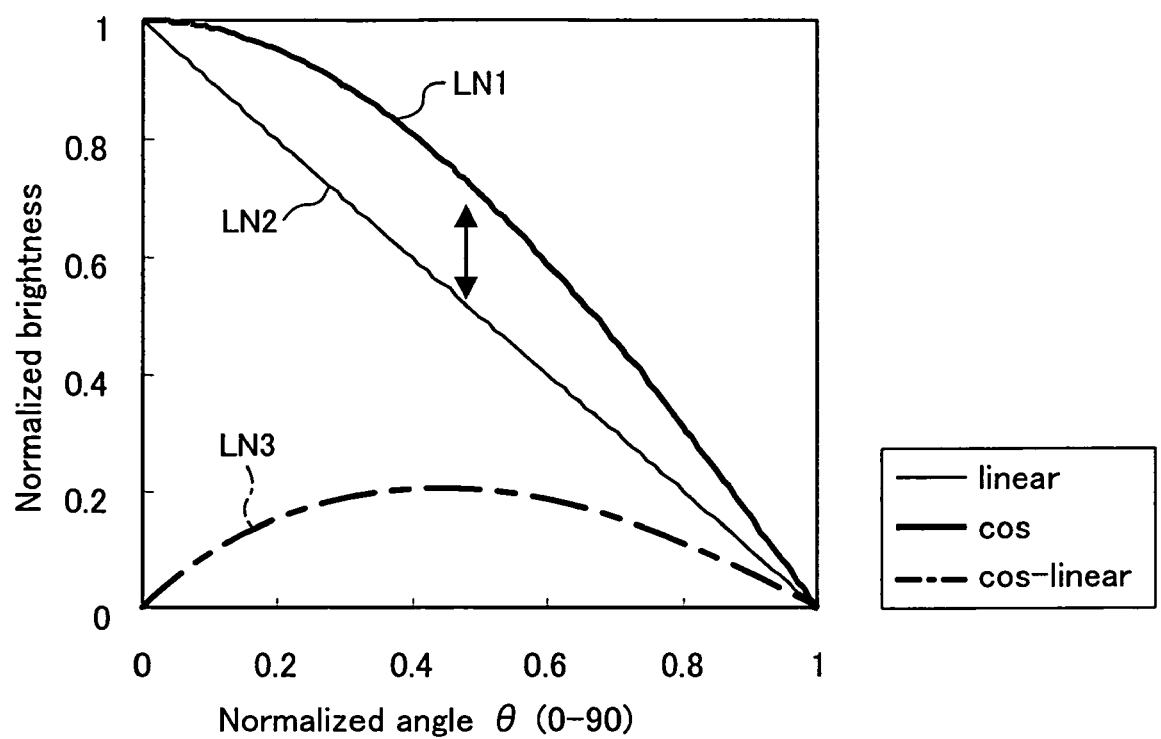
FIG. 12 is a graph illustrating an error between linear interpolation of the brightness value and linear interpolation of the surface normal.

FIG. 11 illustrates the second structure example wherein the image conversion according to the present invention is carried out using a server-client system. Herein, the resolution of a camera 201 is lower than that of a display 202. To make full use of the display capacity of the display 102, image upsizing is carried out in the server-client system.

In a server 301, through the same process as that described in embodiment 1, a shadow distinguishing section 203 distinguishes a shadow portion of first image IIN (input image) to generate shadow distinguished image SIIN which includes information about the shadow portion. Herein, shadow distinguished image SIIN is, for example, a 1-bit scale image where a shadow portion is expressed by 0 and a non-shadow portion is expressed by 1. A data transmitting section 204 transmits first image IIN and shadow distinguished image SIIN to a client 302 through a network 206. In the client 302, an image generating section 205, including first and second conversion sections of the claimed inventions, generates an upsized image (second image) from first image IIN and shadow distinguished image SIIN through the same process as that described in embodiment 1 and supplies the generated upsized image to the display 202.

The present invention is not limited to the structure of FIG. 11. When the resolution of the camera 201 is higher than that of the display 202, the image generating section 205 may generate a downsized image as described in embodiment 2. The camera 201 may be any type of image capturing device, such as a camera mobile phone, digital still camera, video movie camera, or the like. Furthermore, the present invention can be implemented in a reproduction device for reproducing a movie which has been recorded in advance.

As described above, the present invention can be implemented in widespread personal computers, server-client systems, camera mobile phones, digital still cameras, and general video devices, such as video movie cameras, television sets, etc., and does not require any special device, operation, or management. It should be noted that the present invention does not put any limitation on the connection of devices or the internal structures of devices, such as installation in special-purpose hardware, combination of software and hardware, etc.

According to the present invention, image conversion can be carried out while achieving both a light processing load and maintenance of the texture. For example, the present invention can be used in the fields of visual entertainment wherein scenes in sight on the occasions of sport activity, tourism, commemorative photo shooting, etc., are recorded in the form of pictures. Further, in the fields of culture and arts, the present invention can be used for providing a highly-flexible digital archive system which is not limited by a photograph subject or photo shooting location.

What is claimed is:

1. An image conversion method for performing a predetermined image conversion, which is one of image upsizing and image downsizing, on a first image to generate a second image, comprising:
   a first step of distinguishing a shadow portion in the first image;
   a second step of performing a first conversion process on the shadow portion using a brightness value of a pixel according to details of the predetermined image conversion; and
   a third step of performing a second conversion process on a portion other than the shadow portion using a surface normal parameter which represents a surface normal of a photograph subject according to the details of the predetermined image conversion,
   wherein the first step includes the steps of:
   calculating a surface normal parameter of the first image;
   correcting the calculated surface normal parameter on the assumption that a photograph subject has a smooth surface;
   calculating a brightness value from the corrected surface normal parameter according to a predetermined illumination equation; and
   calculating, for each pixel, a difference between the calculated brightness value and an actual brightness value, and recognizing a pixel in which the difference is greater than a predetermined value as being the shadow portion,
   wherein results of the processes performed at the second and third steps are used to generate the second image.

2. The image conversion method of claim 1, further comprising a preprocessing step of processing the first image such that the first image is formed only by a diffuse reflection component.

3. The image conversion method of claim 1, wherein:
   the predetermined image conversion is image upsizing;
   the first conversion process is a process of interpolating a brightness value to upsize an image; and
   the second conversion process is a process of interpolating a surface normal parameter to upsize an image.

4. The image conversion method of claim 1, wherein:
   the predetermined image conversion is image downsizing;
   the first conversion process is a process of subsampling a brightness value to downsize an image; and
   the second conversion process is a process of subsampling a surface normal parameter to downsize an image.

5. The image conversion method of claim 4 further comprising, before the third step, the step of correcting a surface normal parameter of the first image to smoothly change over spatial positions.

6. The image conversion method of claim 1, wherein the surface normal parameter is an angle between a surface normal and a light source direction.

7. A texture mapping method, comprising:
   a preprocessing step of placing a texture image on a 3-dimensional CG model object;
   a first step of distinguishing a shadow portion in the texture image placed on the object;
   a second step of performing a first conversion process on the shadow portion using a brightness value of a pixel according to details of a predetermined image conversion, which is one of image upsizing and image downsizing; and
   a third step of performing a second conversion process on a portion other than the shadow portion using a surface normal parameter which represents a surface normal of a photograph subject according to the details of the predetermined image conversion,
   wherein the first step includes the steps of:
   calculating a surface normal parameter of the texture image;
   correcting the calculated surface normal parameter on the assumption that a photograph subject has a smooth surface;
   calculating a brightness value from the corrected surface normal parameter according to a predetermined illumination equation; and
   calculating, for each pixel, a difference between the calculated brightness value and an actual brightness value, and recognizing a pixel in which the difference is greater than a predetermined value as being the shadow portion,
   wherein results of the processes performed at the second and third steps are used to generate an image of the object.

8. An image conversion device for performing a predetermined image conversion, which is one of image upsizing and image downsizing, on a first image to generate a second image, comprising:
   a shadow distinguishing section for distinguishing a shadow portion in the first image;
   a first conversion section for performing a first conversion process on the shadow portion distinguished in the shadow distinguishing section using a brightness value of a pixel according to details of the predetermined image conversion; and
   a second conversion section for performing a second conversion process on a portion other than the shadow portion using a surface normal parameter which represents a surface normal of a photograph subject according to the details of the predetermined image conversion,
   wherein the shadow distinguishing section includes:
   means for calculating a surface normal parameter of the first image;
   means for correcting the calculated surface normal parameter on the assumption that a photograph subject has a smooth surface;

means for calculating a brightness value from the corrected surface normal parameter according to a predetermined illumination equation; and means for calculating, for each pixel, a difference between the calculated brightness value and an actual brightness value, and recognizing a pixel in which the difference is greater than a predetermined value as being the shadow portion, wherein results of the processes performed by the first and second conversion sections are used to generate the second image.

9. The image conversion device of claim 8, wherein the device is implemented as a server-client system
in which the shadow distinguishing section is included in a server; and
the first and second conversion sections are included in a client.

10. An image conversion program stored in a computer readable medium, wherein the image conversion program instructs a computer to perform a method for performing a predetermined image conversion, which is one of image upsizing and image downsizing, on a first image to generate a second image, the method comprising:
a first step of distinguishing a shadow portion in the first image;
a second step of performing a first conversion process on the shadow portion using a brightness value of a pixel according to details of the predetermined image conversion;
a third step of performing a second conversion process on a portion other than the shadow portion using a surface normal parameter which represents a surface normal of a photograph subject according to the details of the predetermined image conversion; and
a fourth step of generating the second image using results of the processes performed at the second and third steps,
wherein the first step includes the steps of:
calculating a surface normal parameter of the first image;
correcting the calculated surface normal parameter on the assumption that a photograph subject has a smooth surface;
calculating a brightness value from the corrected surface normal parameter according to a predetermined illumination equation; and
calculating, for each pixel, a difference between the calculated brightness value and an actual brightness value, and recognizing a pixel in which the difference is greater than a predetermined value as being the shadow portion.

11. A shadow recognizing method for distinguishing a shadow portion in an image, comprising the steps of:
calculating a surface normal parameter of the image;
correcting the calculated surface normal parameter on the assumption that a photograph subject has a smooth surface;
calculating a brightness value from the corrected surface normal parameter according to a predetermined illumination equation; and
calculating, for each pixel, a difference between the calculated brightness value and an actual brightness value, and recognizing a pixel in which the difference is greater than a predetermined value as being the shadow portion.

12. A shadow recognizing device for distinguishing a shadow portion in an image, comprising:
means for calculating a surface normal parameter of the image:
means for correcting the calculated surface normal parameter on the assumption that a photograph subject has a smooth surface;
means for calculating a brightness value from the corrected surface normal parameter according to a predetermined illumination equation; and
means for calculating, for each pixel, a difference between the calculated brightness value and an actual brightness value, and recognizing a pixel in which the difference is greater than a predetermined value as being the shadow portion.

* * * * *